(12) United States Patent
Onsen

(10) Patent No.: US 8,363,236 B2
(45) Date of Patent: Jan. 29, 2013

(54) INFORMATION PROCESSING APPARATUS, DEVICE MANAGEMENT METHOD, AND COMPUTER-READABLE STORAGE MEDIUM

(75) Inventor: Takahiro Onsen, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 12/364,396

(22) Filed: Feb. 2, 2009

(65) Prior Publication Data

US 2009/0195808 A1   Aug. 6, 2009

(30) Foreign Application Priority Data

Feb. 4, 2008   (JP) ................... 2008-024310

(51) Int. Cl.
*G06F 3/12*   (2006.01)
(52) U.S. Cl. .............. 358/1.13; 358/1.15; 358/1.9
(58) Field of Classification Search .............. None
See application file for complete search history.

(56) References Cited

U.S. PATENT DOCUMENTS

| | | | |
|---|---|---|---|
| 7,372,590 B2 * | 5/2008 | Kuroda ............... | 358/1.15 |
| 2001/0053295 A1 * | 12/2001 | Kujirai et al. ........... | 399/79 |

FOREIGN PATENT DOCUMENTS

| | | |
|---|---|---|
| EP | 1296219 A2 | 3/2003 |
| EP | 1496428 A2 | 1/2005 |
| JP | 2003-162388 A | 6/2003 |
| JP | 2005-25755 A | 1/2005 |
| JP | 2005-174121 | 6/2005 |
| JP | 2008-003784 A | 1/2008 |

* cited by examiner

*Primary Examiner* — Twyler Haskins
*Assistant Examiner* — Lennin Rodriguez
(74) *Attorney, Agent, or Firm* — Canon U.S.A., Inc., IP Division

(57) ABSTRACT

An information processing apparatus is provided in which a device driver configured to control a plurality of devices is installed. The information processing apparatus includes an acquisition unit configured to acquire function information relating to a function of the device, a storage unit configured to store the acquired function information in a storage medium, a determining unit configured to determine whether the device driver controls the devices, and a control unit configured to control an operation of the device through the device driver based on the stored function information. When the determining unit determines that the device driver controls the plurality of devices, function information acquired by the acquisition unit after the determination is made is abandoned without being stored in the storage medium and/or the acquisition unit is prohibited from acquiring function information.

5 Claims, 9 Drawing Sheets

| UNIT CONFIGURATION | | IMAGE FORMING APPARATUS A | IMAGE FORMING APPARATUS B | IMAGE FORMING APPARATUS C |
|---|---|---|---|---|
| PAPER FEED OPTION | SIDE PAPER DECK | YES | YES | YES |
| PAPER OUTPUT OPTION | FINISHER A | YES | YES | YES |
| | FINISHER B | NONE | NONE | NONE |
| PUNCHER UNIT | PUNCHER UNIT A | NONE | YES | YES |
| INTERNAL SPOOLING PROCESSING | | AUTOMATED | AUTOMATED | AUTOMATED |
| SECTION MANAGEMENT FUNCTION | | NONE | YES | NONE |

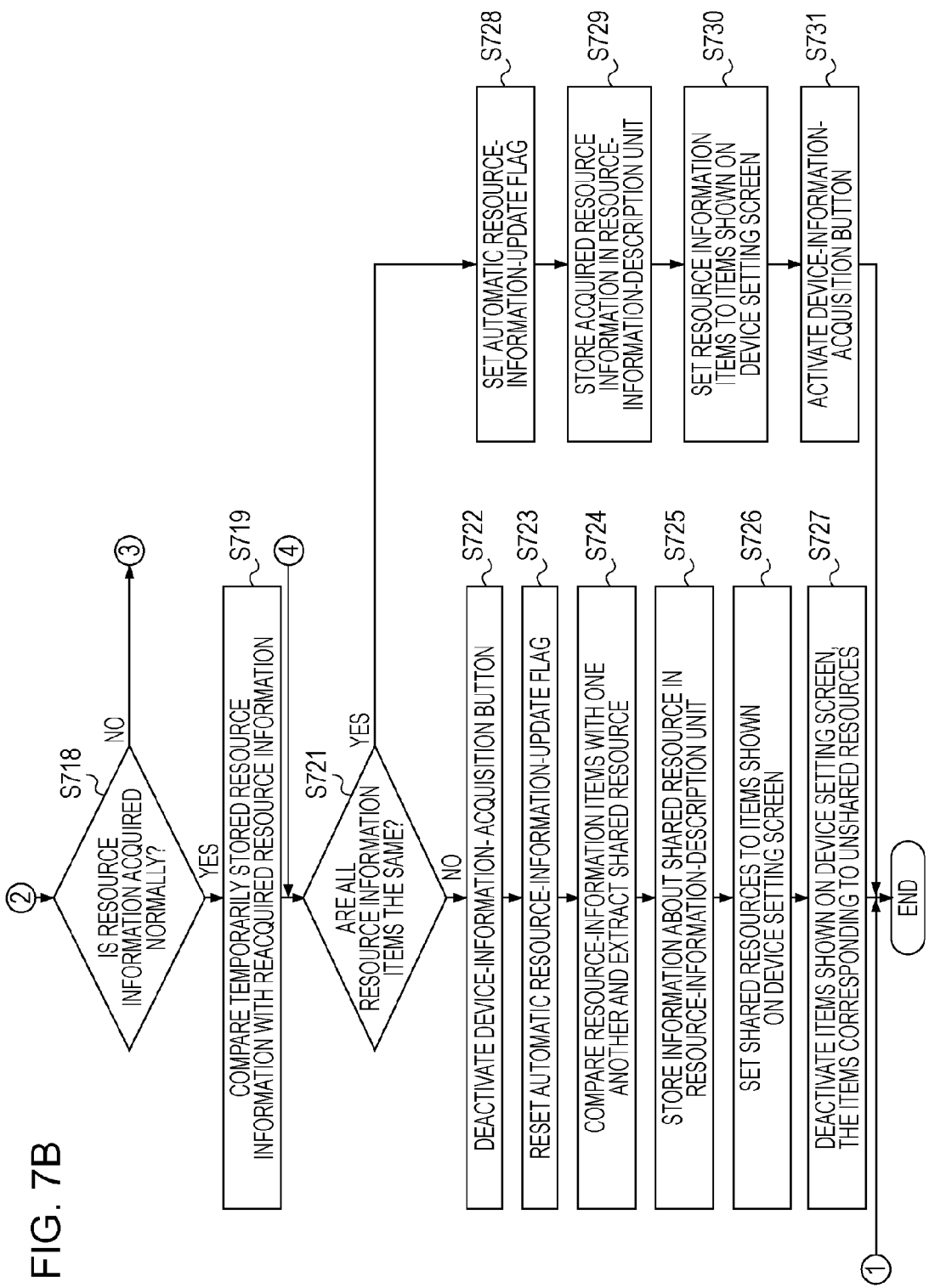

FIG. 8

| IMAGE-FORMING-APPARATUS-IDENTIFICATION INFORMATION | RESOURCE INFORMATION | |
|---|---|---|
| IMAGE FORMING APPARATUS A | PAPER FEED OPTION<br>   SIDE PAPER DECK<br>PAPER OUTPUT OPTION<br>   FINISHER A<br>PUNCHER UNIT<br>   PUNCHER UNIT A<br>INTERNAL SPOOLING PROCESSING<br>   AUTOMATED<br>SECTION MANAGEMENT FUNCTION<br>   YES | 801a |
| IMAGE FORMING APPARATUS B | PAPER FEED OPTION<br>   SIDE PAPER DECK<br>PAPER OUTPUT OPTION<br>   FINISHER A<br>PUNCHER UNIT<br>   NONE<br>INTERNAL SPOOLING PROCESSING<br>   AUTOMATED<br>SECTION MANAGEMENT FUNCTION<br>   YES | 801b |
| IMAGE FORMING APPARATUS C | PAPER FEED OPTION<br>   SIDE PAPER DECK<br>PAPER OUTPUT OPTION<br>   FINISHER A<br>PUNCHER UNIT<br>   PUNCHER UNIT A<br>INTERNAL SPOOLING PROCESSING<br>   AUTOMATED<br>SECTION MANAGEMENT FUNCTION<br>   NONE | 801c |

INFORMATION PROCESSING APPARATUS, DEVICE MANAGEMENT METHOD, AND COMPUTER-READABLE STORAGE MEDIUM

BACKGROUND OF THE INVENTION

1. Field of the Invention

The present invention generally relates to an information processing apparatus, a device management method, and a computer-readable storage medium containing a computer program with computer-executable instructions therefor. The use of aspects of the present invention may be suitable to control operations of at least one device through a single device driver.

2. Description of the Related Art

Generally, a device driver (e.g., printer driver) may be used to make an image forming system execute print processing, the image forming system including an information processing apparatus and a plurality of image forming apparatuses that are connected to one another via a network. The device driver is typically software provided to control the image forming apparatus, so as to make the image forming apparatus execute processing such as printing, and may be installed in the information processing apparatus.

A single device driver can control a plurality of image forming apparatuses connected to a network. However, the capabilities of the image forming apparatuses are not necessarily identical with one another. Therefore, when the device driver controls the image forming apparatuses, it may be difficult for some of the image forming apparatuses to use the function of the device driver. Therefore, Japanese Patent Laid-Open No. 2005-174121 and Japanese Patent Laid-Open No. 2003-162388 have proposed technologies for preventing a user from setting a function of the device driver, in the case where the function is difficult to use for some of the image forming apparatuses.

Furthermore, to make the image forming apparatus execute the print processing by using the device driver, the image processing apparatus typically should acquire resource information from the image forming apparatus, and set the resource information to the device driver. Therefore, the following technology has been proposed. Namely, a user manually operates the user interface of a device driver, and an information processing apparatus acquires resource information from an image forming apparatus based on details of the operation, and sets the acquired resource information to the device driver. Furthermore, Japanese Patent Laid-Open No. 2005-25755 has proposed a technology for allowing an information processing apparatus to automatically acquire resource information from an image forming apparatus connected to the information processing apparatus via a network, and set the acquired resource information to a device driver. According to the above-described technology, the resource information set to the device driver can be updated and set not only at the installation time, but also after the installation and/or when the resource of the image forming apparatus is updated.

SUMMARY OF THE INVENTION

According to one embodiment of the present invention, an information processing apparatus is provided in which a device driver is installed, the device driver being configured to control a plurality of devices. The information processing apparatus includes an acquisition unit configured to acquire function information relating to a function of the device, a storage unit configured to store the acquired function information in a storage medium, a determining unit configured to determine whether the device driver controls the devices, and a control unit configured to control an operation of the device through the device driver based on the stored function information. When the determining unit determines that the device driver controls the plurality of devices, function information acquired by the acquisition unit after the determination is made is abandoned without being stored in the storage medium and/or the acquisition unit is prohibited from acquiring function information.

Further features of the present invention will become apparent from the following description of exemplary embodiments with reference to the attached drawings.

BRIEF DESCRIPTION OF THE DRAWINGS

FIG. 8 shows exemplary resource information items acquired from all of image forming apparatuses controlled by the device driver in tabular form according to the second embodiment.

DESCRIPTION OF THE EMBODIMENTS

Hereinafter, a first embodiment of the present invention will be described with reference to the attached drawings.

[Description of System]

Figure 1:
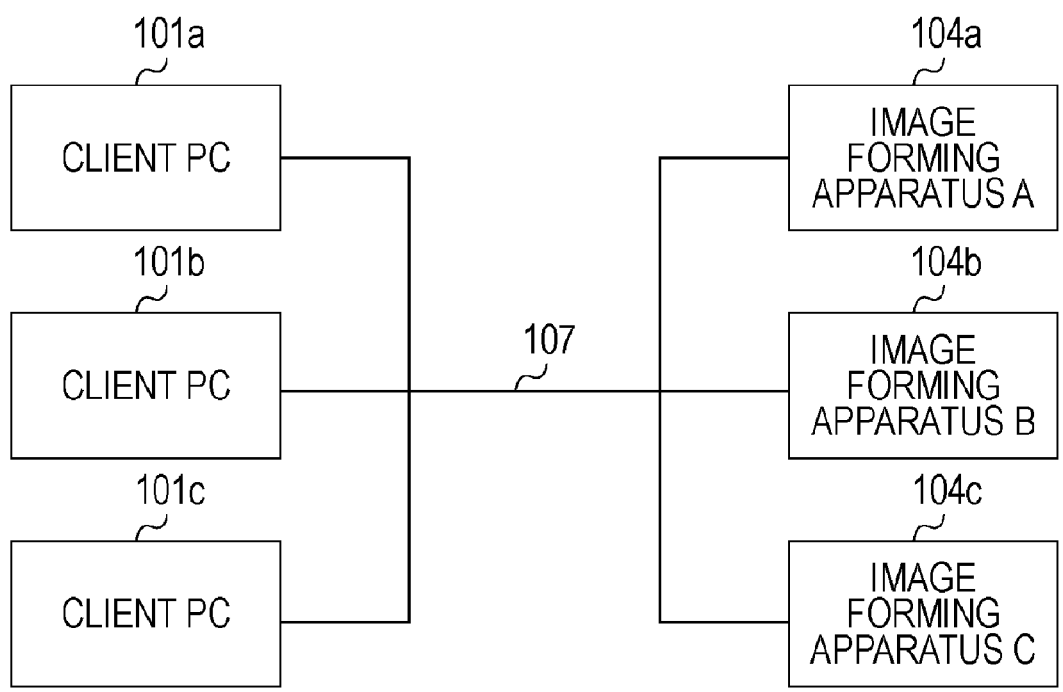
FIG. 1 is a block diagram showing an exemplary configuration of an image forming system according to a first embodiment of the present invention.

FIG. 1 is a block diagram showing an exemplary configuration of an image forming system. As shown in FIG. 1, units included in the above-described image forming system are connected to one another through a network 107. The network 107 may include a single system and/or a plurality of systems.

In FIG. 1, each of client PCs 101a, 101b, and 101c is an exemplary information processing apparatus in which a device driver is installed, where the device driver is configured to control a plurality of devices. Further, each of the client PCs 101a, 101b, and 101c has a function of performing bidirectional communication with image forming apparatuses 104a, 104b, and 104c that are connected to the network 107. In each of the client PCs 101a to 101c, software programs including an operating system (OS), a device driver provided to control the image forming apparatuses 104a to 104c (e.g., a printer driver), an image-generation application, and so forth are installed.

Figure 2:
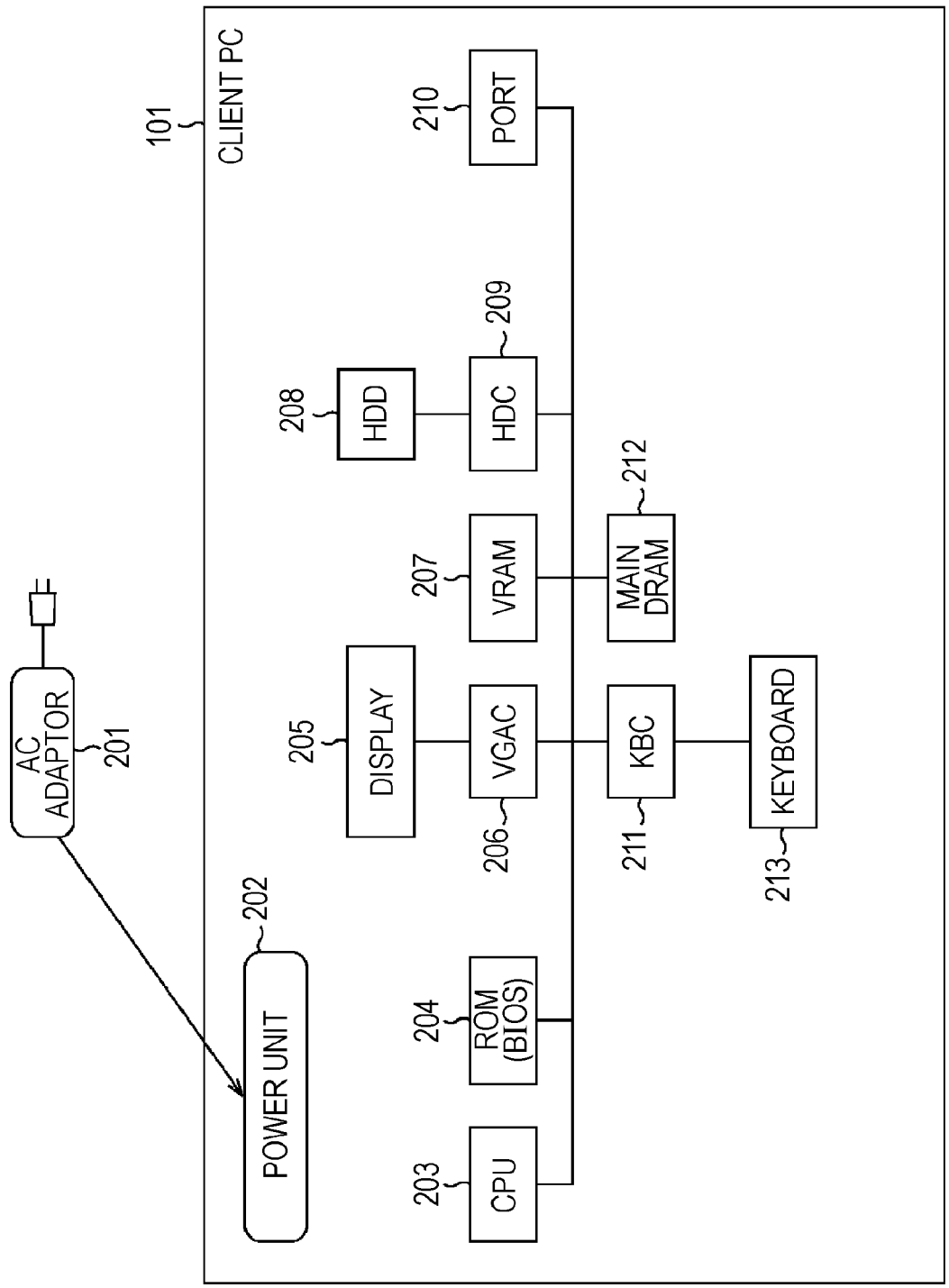
FIG. 2 is a block diagram showing an exemplary internal configuration of a client personal computer (PC) according to the first embodiment.

FIG. 2 is a block diagram showing an exemplary internal configuration of the client PC 101. In FIG. 2, an alternating current (AC) adapter 201 is externally connected to the client PC 101, as the drive source of the client PC 101.

In one version, the client PC 101 includes a power unit 202, a central processing unit (CPU) 203, a read-only memory (ROM) 204 storing basic input/output system (BIOS) or the like, a display 205 including a liquid crystal display (LCD) or the like, a video controller (VGAC) 206, and a video memory (VRAM) 207. Further, the client PC 101 may include a hard disk drive (HDD) 208, a hard disk controller (HDC) 209, and a network port (PORT) 210. In addition, the client PC 101 can include a keyboard controller (KBC) 211, a keyboard 213, and a system main memory (MAIN DRAM) 212.

According to the embodiment as shown, in the host unit of the client PC 101, the power unit 202 supplies power shared among the above-described units. The CPU 203 is provided as the main controller of the client PC 101. The BIOS stored in the ROM 204 provides instructions to perform the basic control of the CPU 203. The HDD 208, which is a writable nonvolatile memory device, is controlled by the HDC 209.

The CPU 203 reads a software program from the HDD 208 and expands the software program into the MAIN DRAM 212, and executes the software program by using the MAIN DRAM 212. At that time, the CPU 203 produces and shows the image of a character or the like of which data is written into the VRAM 207 on the display 205.

Furthermore, a user may operate the client PC 101 by performing key inputting through the keyboard 213. In the embodiment as shown, the KBC 211 processes key-input information relating to data which is key-inputted from the keyboard 213. The PORT 210 communicates with the image forming apparatus 104 connected to the network 107 via the network 107. The user may also operate the client PC 101 by using a mouse, and thus the invention is not limited only to those cases where the client PC 101 is operated through the use of the keyboard 213.

Software programs including an OS, various types of applications, a device driver, and so forth are stored in the HDD 208. The above-described software programs may be executed through the CPU 203.

Furthermore, the user may operate the keyboard 213 or the like based on the various types of software programs stored in the HDD 208. The client PC 101 can make settings on the image forming system, acquire information from the image forming apparatus 104, and execute print processing based on the above-described operation.

Returning to the description of FIG. 1, the image forming apparatus 104 in this embodiment is provided as an exemplary device. Namely, the image forming apparatus 104 has a function of transmitting resource information relating to the resource thereof to the client PC 101 when an inquiry is transmitted from the client PC 101 to the image forming apparatus 104 and/or when the resource of the image forming apparatus 104 is changed. Further, the image forming apparatus 104 has a function of receiving a print job (print data) transmitted from the client PC 101 and executing print processing based on the transmitted print job.

It should be understood that the numbers of the client PCs 101 and the image forming apparatuses 104 that are included in the image forming system are not limited to only those of the client PCs 101 and the image forming apparatuses 104 that are shown in FIG. 1.

Figure 3:
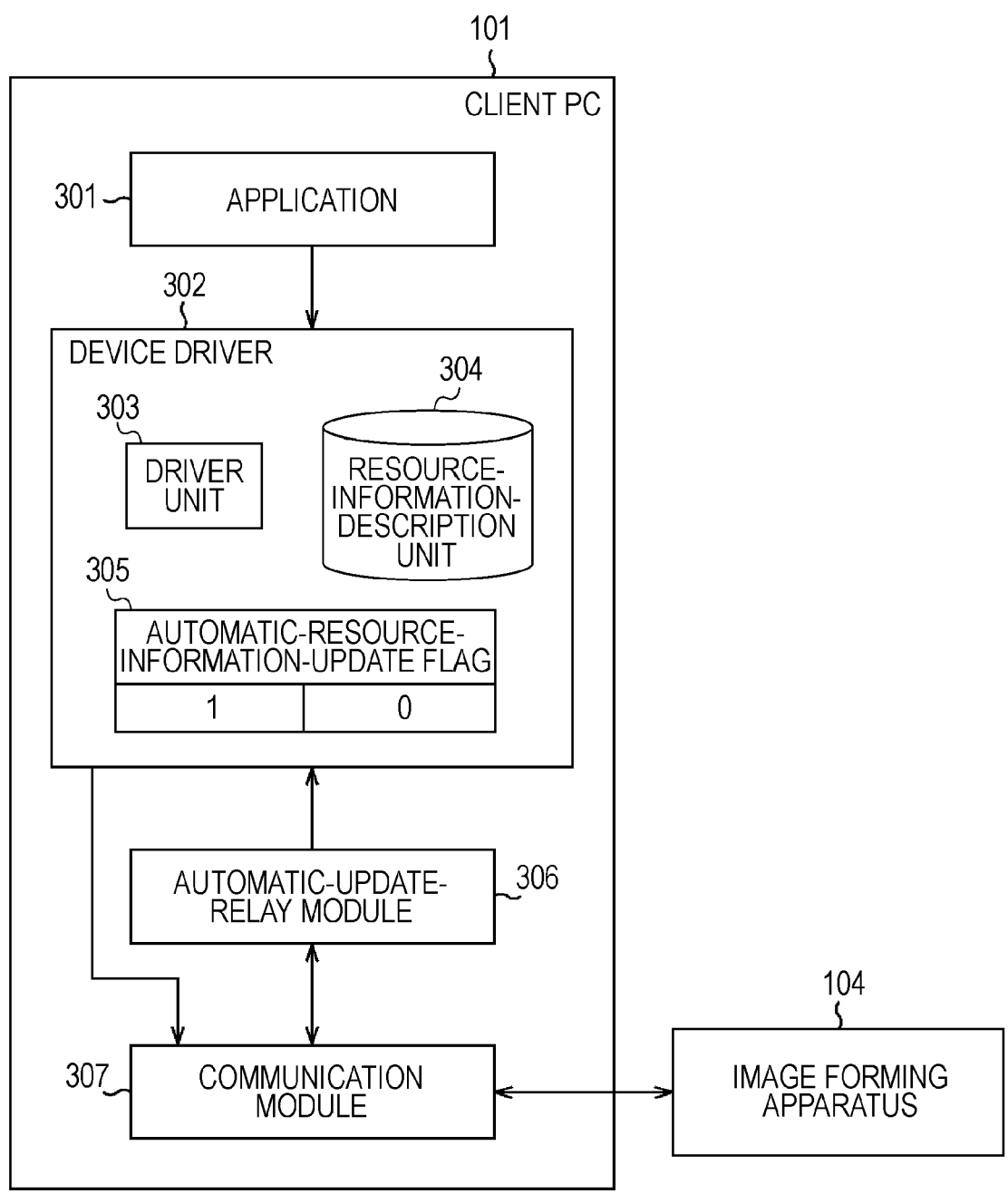
FIG. 3 is a block diagram schematically showing an exemplary configuration of a software program installed in the client PC according to the first embodiment.

FIG. 3 is a block diagram schematically showing an exemplary configuration of a software program installed in the HDD 208 of the client PC 101.

In this embodiment, the CPU 203 of the client PC 101 reads a software program as shown in FIG. 3 from the HDD 208 and expands the software program into the MAIN DRAM 212. Then, the CPU 203 executes the software program by using the MAIN DRAM 212. More specifically, the CPU 203 of the client PC 101 executes the software program shown in FIG. 3 and acquires resource information that is exemplary function information from the image forming apparatus 104 connected to the network 107. Then, the CPU 203 sets the acquired resource information to the device driver and transmits a print job (e.g., print data) to the image forming apparatus 104, so that the image forming apparatus 104 executes print processing.

In FIG. 3, an application 301 is provided to generate a document. The user generates a document by performing an operation based on the execution of the application 301, and issues a print instruction.

In the embodiment as shown, a device driver 302 includes a driver unit 303, a resource-information-description unit 304, and an automatic-resource-information-update flag 305. The device driver 302 is associated with a plurality of predetermined image forming apparatuses, that is, the image forming apparatuses 104a to 104c, so that the device driver 302 can control operations of the above-described image forming apparatuses 104a to 104c.

According to the above-described embodiment, information about which device driver controls which image forming apparatus may be managed by the OS installed in the client PC 101. More specifically, the above-described information is stored in a device-driver-information-storage area provided in the HDD 208 of the client PC 101, as image-forming-apparatus-control information.

According to this embodiment, the device driver 302 installed in the client PC 101 can control the image forming apparatuses 104a to 104c. Therefore, the image-forming-apparatus-control information indicating that the device driver 302 controls the operations of the image forming apparatuses 104a to 104c is stored in the device-driver-information-storage area provided in the HDD 208.

In this embodiment, the driver unit 303 of the device driver 302 has an automatic-resource information-acquisition function (e.g., automatic-resource-information-update function) provided to acquire the resource information of each of the image forming apparatuses 104a to 104c, and automatically store the resource information in the resource-information-description unit 304. Furthermore, the driver unit 303 may have a function for stopping the automatic-resource-information-acquisition function of the device driver 302 in accordance with the status of each of the image forming apparatuses 104a to 104c. Still further, the driver unit 303 may have a print-data-transmission function, so as to process document data generated by the application 301 into print data, and transmit the print data to the image forming apparatus 104 specified by the user.

The resource-information-description unit 304 may store the resource information of each of the image forming apparatuses 104a to 104c.

The automatic-resource-information-update flag 305 may be provided to indicate whether the automatic-resource-information-acquisition information is activated. The state where the automatic-resource-information-update flag 305 is set (=1) denotes that the automatic-resource-information-acquisition function of the device driver 302 is activated. On the other hand, the state where the automatic-resource-information-update flag 305 is reset (=0) denotes that the automatic-resource-information-acquisition function of the device driver 302 is deactivated.

When the automatic-resource-information-update flag 305 is set, the driver unit 303 acquires the resource information transmitted from the image forming apparatus 104 and stores the acquired resource information in the resource-information-description unit 304.

On the other hand, when the automatic-resource-information-update flag 305 is reset, the driver unit 303 abandons the resource information transmitted from the image forming apparatus 104, without storing the resource information in the resource-information-description unit 304. Otherwise, the driver unit 303 may change the user interface of the device driver, so as not to accept an acquisition instruction transmitted from the user. For example, the driver unit 303 may gray out an acquisition button, for example, so as not to accept the acquisition instruction transmitted from the user. That is to say, the user interface may be configured such that the acquisition of the resource information is prohibited.

An automatic-update-relay module 306 may have a function for acquiring the resource information transmitted from the image forming apparatus 104 via a communication module 307, and passing the resource information on to higher order software (e.g., the device driver 302). The automatic-update-relay module 306 may be a module independent of the device driver 302.

The communication module 307 may have a function for transmitting and/or receiving data to and/or from the image forming apparatuses 104a to 104c, the device driver 302, and the automatic-update-relay module 306.

The client PC 101 receives the resource information transmitted from the image forming apparatus 104 by using the communication module 307, and transmits device-control information including, for example, a NOTIFY/NO-NOTIFY command of the resource information, and/or print data, to the image forming apparatus 104.

Upon receiving the resource-information-notify command transmitted from the client PC 101, the image forming apparatus 104 may transmit the resource information to the client PC 101. Furthermore, the image forming apparatus 104 may automatically transmit the resource information to the client PC 101 when a condition that is set to the image forming apparatus 104 in advance, has been satisfied. For example, when the power is turned on and/or the unit configuration is changed, the image forming apparatus 104 may automatically transmit the resource information to the client PC 101 specified in advance. Further, the image forming apparatus 104 can automatically transmit the resource information to the client PC 101 specified in advance at regular intervals.

Figures 4, 5:
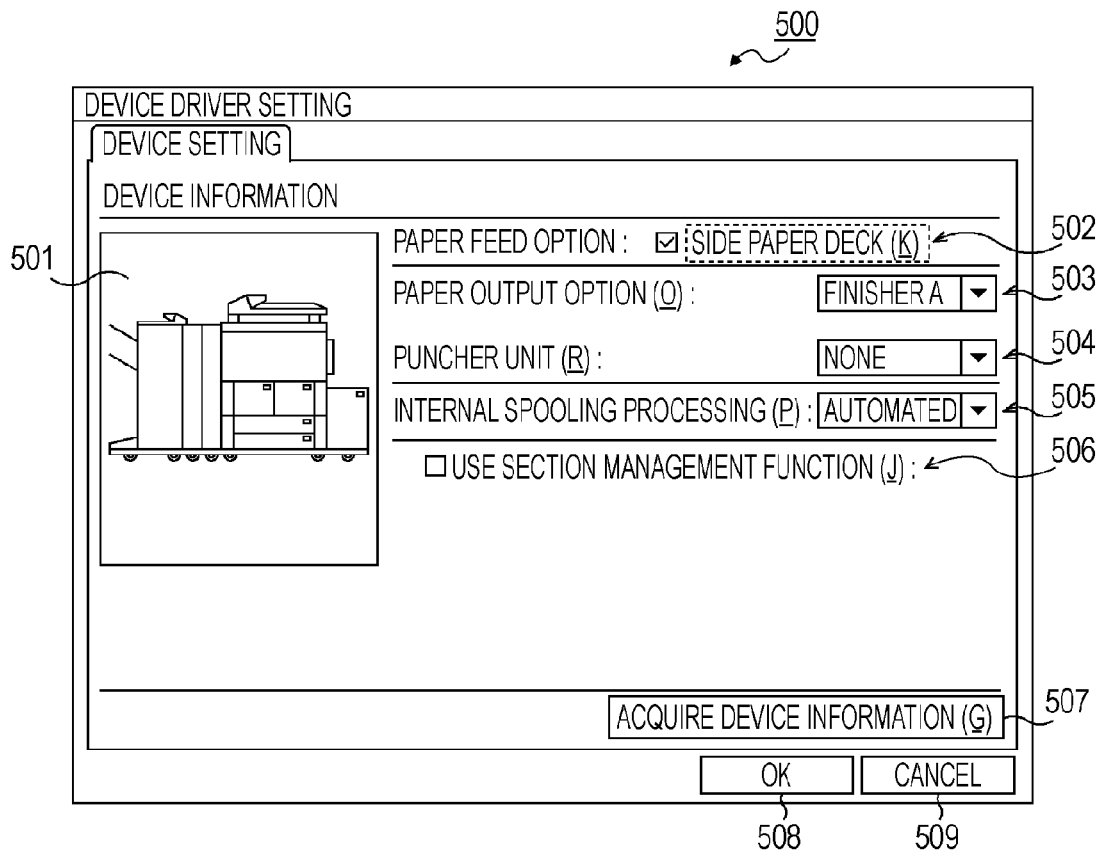
FIG. 4 shows exemplary unit configurations of image forming apparatuses in tabular form according to the first embodiment.
FIG. 5 shows an exemplary device setting screen shown on a display through processing performed by a device driver installed in the client PC according to the first embodiment.

FIG. 4 shows an exemplary unit configuration of the image forming apparatus 104 in tabular form. Image forming apparatuses A, B, and C that are shown in FIG. 4 correspond to the image forming apparatuses 104a to 104c that are shown in FIG. 1, respectively. As shown in FIG. 4, the unit configurations of the image forming apparatuses A to C are different from one another.

Namely, the image forming apparatus A includes a side paper deck as a paper feed option, and a finisher A as a paper output option. Further, settings are made so that internal spooling processing of the image forming apparatus A is automatically performed. Still further, the image forming apparatus A does not have a puncher unit or a section management function.

The image forming apparatus B includes the side paper deck as the paper feed option, the finisher A as the paper output option, and a puncher unit A as the puncher unit. Further, settings are made so that the internal spooling processing of the image forming apparatus B is automatically performed. Still further, the image forming apparatus B has the section management function.

The image forming apparatus C includes the side paper deck as the paper feed option, the finisher A as the paper output option, and the puncher unit A as the puncher unit. Further, settings are made so that the internal spooling processing of the image forming apparatus C is automatically performed. Still further, the image forming apparatus C does not have the section management function.

FIG. 5 shows an exemplary device setting screen shown on the display 205 through processing performed by the device driver 302 (e.g., the driver unit 303) installed in the client PC 101 shown in FIG. 1.

According to one version, when the user performs an operation based on the execution of the device driver 302 by using the keyboard 213 of the client PC 101, a device setting screen 500 is shown on the display 205 of the client PC 101. At that time, the device driver 302 generates the device setting screen 500 based on the "resource information of the image forming apparatus 104" stored in the resource information description unit 304, and displays the device setting screen 500 on the display 205.

In one version, the user can set the resource of the image forming apparatus 104 used to perform printing by performing an operation for the device setting screen 500.

In FIG. 5, a preview area 501 is an area provided to graphically display settings of the paper feed option and the paper output option of the image forming apparatus 104. A paper-feed-option-unit-setting area 502 is an area provided to display a check box that allows the user to select a paper-feed-option unit.

A paper-output-option-unit-setting area 503 is an area provided to display a drop-down-list box that allows the user to select the type of a paper-output-option unit. A puncher-unit-setting area 504 is an area provided to display a drop-down-list box that allows the user to select the puncher unit.

An internal-spooling-processing-setting area 505 is an area provided to display a drop-down-list box that allows the user to determine whether print-spooling processing should be performed inside the computer.

A section-management-function-setting area 506 is an area provided to display a check box that allows the user to select whether a section-management function should be used, the section-management function being provided to, for example, calculate and/or manage information about the number of printing for each of predetermined groups. When the user clicks on a device-information-acquisition button 507, the device driver 302 acquires resource information indicating the paper output option, the paper feed option, and so forth, from the image forming apparatus 104.

In one version, the acquired resource information may be stored in the resource-information-description unit 304 in accordance with the status of the automatic-resource-information-update flag 305, and may affect the values set for the items shown on the device setting screen 500. When the user clicks on an OK button 508, the device driver 302 determines the values set for the items shown on the device setting screen 500. When the user clicks on a cancellation button 509, the device driver 302 abandons the values set for the items shown on the device setting screen 500.

[Description of Processing]
[Resource-Information-Acquisition Processing]

Figure 6:
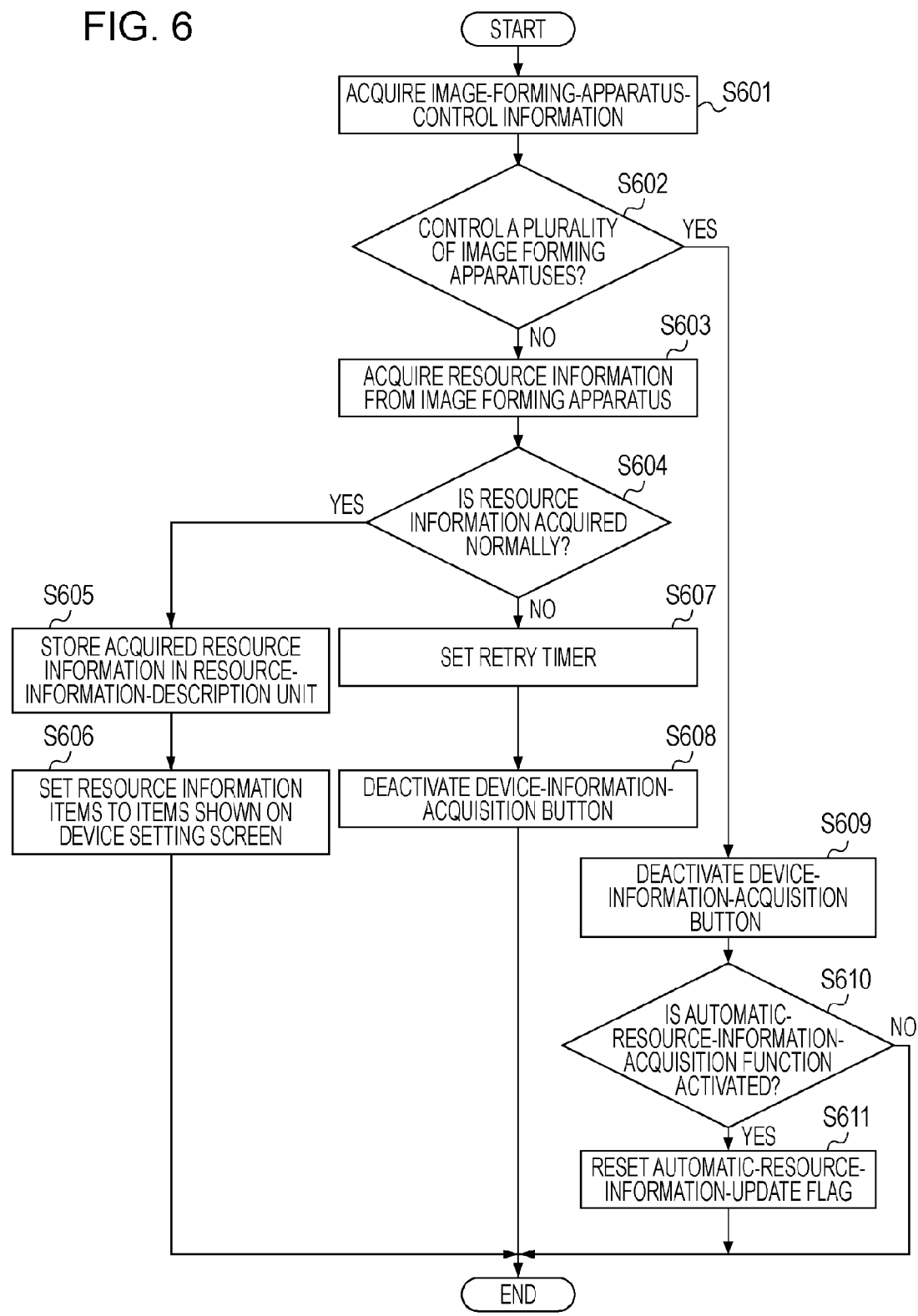
FIG. 6 is a flowchart illustrating exemplary resource-information-acquisition processing performed by the device driver according to the first embodiment.

FIG. 6 is a flowchart illustrating exemplary resource-information-acquisition processing of the device driver 302 running on the client PC 101. Exemplary processing performed to deactivate the automatic-resource-information-update function of the device driver 302 installed in the client PC 101 will be described with reference to FIG. 6.

For example, immediately after the device driver 302 is installed in the client PC 101, and/or information about the image forming apparatus 104 which is to be controlled is added to information stored in the device driver 302, processing performed through the automatic-resource-information-acquisition function of the device driver 302 may be started.

At step S601 shown in FIG. 6, the device driver 302 acquires the image-forming-apparatus-control information by referring to the device-driver-information-storage area managed by the OS. As described above, the image-forming-apparatus-control information is information indicating which device driver controls which image forming apparatus.

Next, at step S602, the device driver 302 determines whether the device driver 302 controls a plurality of the image forming apparatuses 104 by referring to the image-forming-apparatus-control information acquired at step S601. If the determination result shows that the device driver 302 controls the plurality of image forming apparatuses 104 (YES in step S602), the processing advances to step S609, which will be described later.

Thus, in the above-described embodiment, an exemplary determining section is achieved, for example, through performing the processing corresponding to step S602. On the other hand, if the device driver 302 does not control the plurality of image forming apparatuses 104 (NO in step S602), the processing advances to step S603, so that the device driver 302 communicates with one of the image forming apparatuses 104 controlled by the device driver 302, and acquires the resource information of the above-described image forming apparatus 104. Thus, in the above-described embodiment, an exemplary acquisition section is achieved, for example, through performing the processing corresponding to step S603.

Next, the device driver 302 determines whether the resource information is normally acquired from the image forming apparatus 104 at step S604. If the determination result shows that the resource information is not acquired normally (NO in step S604), the processing advances to step S607, which will be described later. On the other hand, if the resource information is acquired normally (YES in step S604), the processing advances to step S605, so that the device driver 302 stores the resource information acquired at step S603 in the resource-information-description unit 304.

Thus, in the above-described embodiment, an exemplary storage section is achieved, for example, by performing the processing corresponding to step S605. Next, at step S606, the device driver 302 updates the items shown on the device setting screen 500 of the device driver 302 with the resource information stored at step S605 (e.g., sets the resource information stored at step S605 to the items shown on the device setting screen 500), and terminates the processing procedures.

If the device driver 302 determines that the resource information is not acquired normally from the image forming apparatus 104 at step S604 (NO in step S604), the processing advances to step S607, where the device driver 302 sets a retry timer. Next, at step S608, the device driver 302 deactivates the device-information-acquisition button 507 shown on the device setting screen 500, and terminates the processing procedures.

If the device driver 302 opens the device setting screen 500 based on an operation performed by the user in that state, the device-information-acquisition button 507 may be grayed out and deactivated, so as not to be selected by the user. After that, when the retry timer set at step S607 reaches predetermined time, the device driver 302 can restart performing the processing procedures from step S601.

If the determination result shows that the device driver 302 controls the plurality of image forming apparatuses 104 at step S602 (YES in step S602), the processing advances to step S609, so that the device driver 302 deactivates the device-information-acquisition button 507 shown on the device setting screen 500 of the device driver 302.

Next, at step S610, the device driver 302 determines whether the automatic-resource-information-acquisition function is activated by referring to the automatic-resource-information-update flag 305. If the determination result shows that the automatic-resource-information-acquisition function is deactivated (NO in step S610), the device driver 302 terminates the processing procedures.

On the contrary, if the automatic-resource-information-acquisition function is activated (YES in step S610), the processing advances to step S611, so that the device driver 302 resets the automatic-resource-information-update flag 305 and terminates the processing procedures. From then on, if the resource information is transmitted from the image forming apparatus 104, the device driver 302 abandons the resource information. In the above-described embodiment, an exemplary storage section may be achieved through the processing procedures performed by the above-described device driver 302.

Thus, according to the above-described embodiment, when the device driver 302 of the client PC 101 controls the plurality of image forming apparatuses 104, the automatic-resource-information-update flag 305 is reset so that the acceptance of the resource information of the image forming apparatus 104 is prohibited. Therefore, it may become possible to prohibit the device driver 302 from instructing the image forming apparatus 104 to execute a function which may be difficult for the image forming apparatus 104 to execute.

Therefore, when the device driver 302 instructs the image forming apparatuses 104a and 104b to execute the print processing, it may become possible to reduce print errors occurring due to the difference between the resources of the image forming apparatus 104a and 104b. Accordingly, it may become possible to achieve an image forming system that is easier for the user to operate than in the past.

Next, a second embodiment of the present invention will be described. According to the above-described first embodiment, when the device driver 302 controls the image forming apparatuses 104a to 104c, the acceptance of the resource information provided from then on is unconditionally prohibited. According to the second embodiment, however, if all of the resource information items of the image forming apparatuses 104a to 104c are identical, the acceptance of the resource information items is permitted, even though the device driver 302 controls the image forming apparatuses 104a to 104c.

Furthermore, when the device driver 302 controls the image forming apparatuses 104a to 104c and the resource information items of the image forming apparatuses 104a to 104c are different from one another, the acceptance of a resource information item shared among the resource information items is permitted. On the other hand, the acceptance of a resource information item which is not shared among the resource information items is prohibited.

Thus, processing performed to deactivate the automatic-resource-information-update function in the second embodiment is partly different from that performed in the first embodiment, which is the main difference between the first and second embodiments. Consequently, in the description of the second embodiment, the same components as those used in the above-described first embodiment are designated by the same reference numerals as those shown in FIGS. 1 to 6 and the detailed descriptions of the above-described components are being omitted herein.

[Resource Information Acquisition Processing]

Figure 7A:
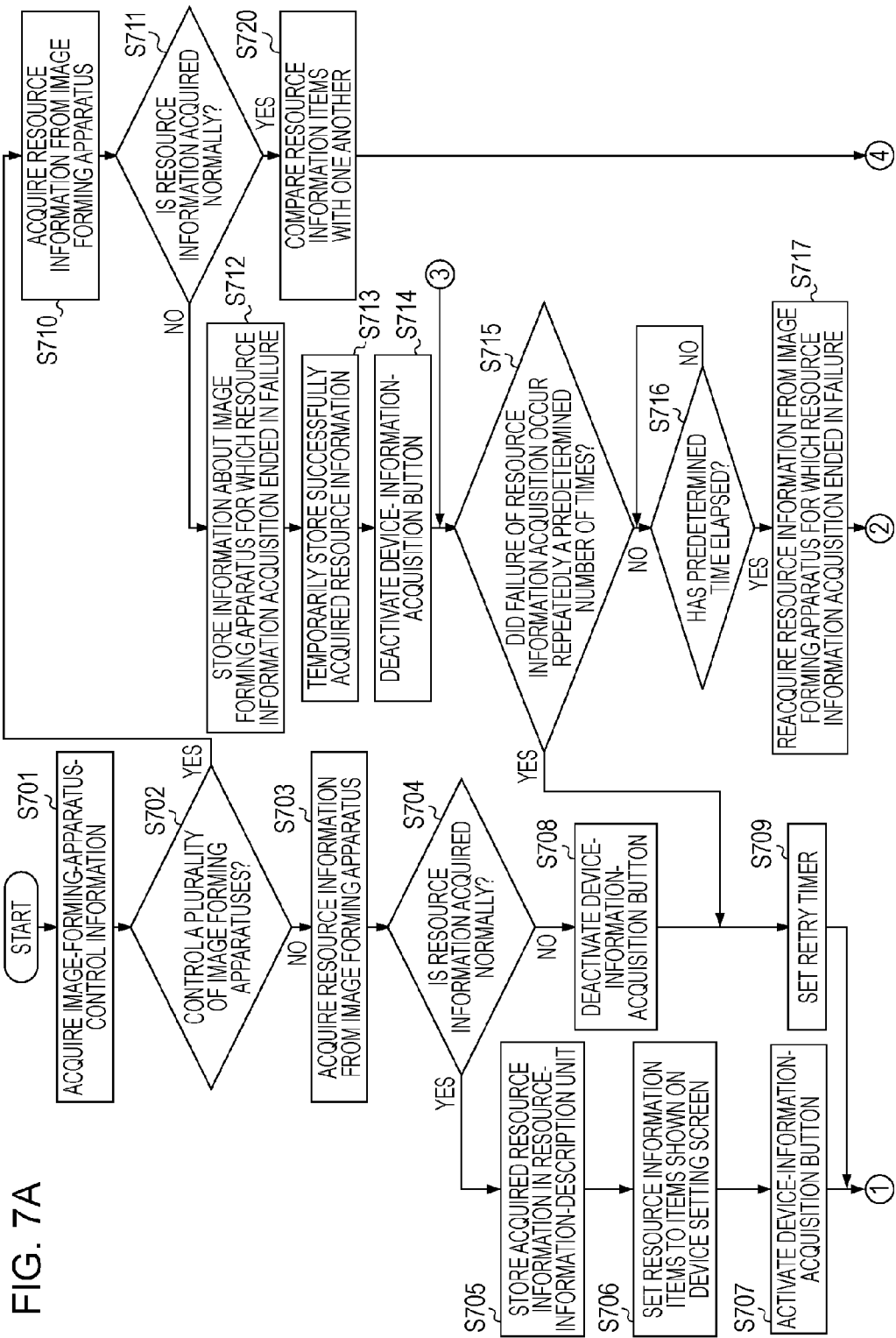
FIG. 7 is a flowchart illustrating exemplary resource-information-acquisition processing performed by the device driver according to a second embodiment of the present invention.

FIGS. 7A and 7B are a flowchart illustrating exemplary resource-information-acquisition processing performed by the device driver 302 running on the client PC 101. Exemplary processing performed to deactivate the automatic-resource-information-update function of the device driver 302 installed in the client PC 101 will be described with reference to FIGS. 7A and 7B.

For example, immediately after the device driver 302 is installed in the client PC 101, and/or information about the image forming apparatus 104 that is to be controlled is added to information stored in the device driver 302, processing performed through the automatic-resource-information-acquisition function of the device driver 302 is started. Furthermore, in the above-described embodiment, when the unit configuration of the image forming apparatus 104 is changed, and the image forming apparatus 104 transmits the resource information to the device driver 302, the processing performed through the automatic-resource-information-acquisition function of the device driver 302 is started.

At step S701 shown in FIG. 7A, the device driver 302 acquires the image-forming-apparatus-control information by referring to the device-driver-information-storage area managed by the OS. As described above, the image-forming-apparatus-control information is information indicating which device driver controls which image forming apparatus.

Next, at step S702, the device driver 302 determines whether the device driver 302 controls a plurality of the image forming apparatuses 104 by referring to the image-forming-apparatus-control information acquired at step S701. If the determination result shows that the device driver 302 controls the plurality of image forming apparatuses 104 (YES in step S702), the processing advances to step S710, which will be described later. Thus, in the above-described embodiment, an exemplary determining section is achieved through performing the processing corresponding to step S702, for example.

On the other hand, if the device driver 302 does not control the plurality of image forming apparatuses 104 (NO in step S702), the processing advances to step S703, so that the device driver 302 communicates with one of the image forming apparatuses 104 controlled by the device driver 302, and acquires the resource information of the above-described image forming apparatus 104. Thus, in the above-described embodiment, an exemplary acquisition section is achieved, for example, through performing the processing corresponding to step S703.

Next, at step S704, the device driver 302 determines whether the resource information is normally acquired from the image forming apparatus 104. If the determination result shows that the resource information is not acquired normally (NO in step S704), the processing advances to step S708 which will be described later.

On the other hand, if the resource information is acquired normally (YES in step S704), the processing advances to step S705, and the device driver 302 stores the resource information acquired at step S703 in the resource-information-description unit 304. Thus, in the above-described embodiment, an exemplary storage section is achieved, for example, by performing the processing corresponding to step S705.

Next, at step S706, the device driver 302 updates the items shown on the device setting screen 500 of the device driver 302 with the resource information stored at step S705 (e.g., sets the resource information stored at step S705 to the items shown on the device setting screen 500). Next, at step S707, the device driver 302 activates the device-information-acquisition button 507 shown on the device setting screen 500 of the device driver 302 and terminates the processing procedures.

If it is determined that the resource information is not normally acquired from the image forming apparatus 104 at step S704 (NO in step S704), the processing advances to step S708. At step S708, the device driver 302 deactivates the device-information-acquisition button 507 shown on the device setting screen 500 of the device driver 302. Next, at step S709, the device driver 302 sets the retry timer and terminates the processing procedures.

If the device driver 302 opens the device setting screen 500 based on an operation performed by the user in that state, the device-information-acquisition button 507 displayed on the device setting screen 500 may be grayed out and deactivated, so as not to be selected by the user. After that, when the retry timer set at step S709 reaches predetermined time, the device driver 302 can restart performing the processing procedures from step S701.

If it is determined that the device driver 302 controls the plurality of image forming apparatuses 104 at step S702 (YES in step S702), the processing advances to step S710 so that the device driver 302 acquires the resource information from each of the image forming apparatuses 104 controlled by the device driver 302. Thus, in the above-described embodiment, an exemplary acquisition section is achieved, for example, by performing the processing corresponding to step S710.

FIG. 8 shows exemplary resource information items acquired from all of the image forming apparatuses 104*a* to 104*c* that are controlled by the device driver 302, in tabular form. Image forming apparatuses A, B, and C that are shown in FIG. 8 correspond to the image forming apparatuses 104*a* to 104*c* that are shown in FIG. 1, respectively.

According to the above-described embodiment, as shown in FIG. 8, the device driver 302 acquires resource information 801*a* from the image forming apparatus A. The resource information 801*a* includes information indicating that the paper feed option is the "side paper deck", the paper output option is the "finisher A", the puncher unit is the "puncher unit A", and the internal spooling processing is "automated", and the section management function is "yes".

Further, the device driver 302 acquires resource information 801*b* from the image forming apparatus B. The resource information 801*b* includes information indicating that the paper feed option is the "side paper deck", the paper output option is the "finisher A", the puncher unit is "none", and the internal spooling processing is "automated", and the section management function is "yes".

Further, the device driver 302 acquires resource information 801*c* from the image forming apparatus C. The resource information 801*c* includes information indicating that the paper feed option is the "side paper deck", the paper output option is the "finisher A", the puncher unit is the "puncher unit A", and the internal spooling processing is "automated", and the section management function is "none".

Returning to the description of FIG. 7A, the device driver 302 determines whether the resource information item is normally acquired from each of the image forming apparatuses controlled by the device driver 302 at step S711. If the determination result shows that the resource information items are normally acquired (YES in step S711), the processing advances to step S720, and the device driver 302 compares the "resource information items of all of the image forming apparatuses" that are acquired at step S710 with one another. After that, the processing advances to step S721, which will be described later.

Thus, in the above-described embodiment, an exemplary comparison section is achieved by, for example, performing the processing corresponding to step S720.

On the other hand, if it is determined that the resource information items are not normally acquired at step S711 (NO in step S711), the processing advances to step S712. At step S712, the device driver 302 determines the image forming apparatus 104 for which the resource information acquisition ended in failure, and stores image-forming-apparatus information relating to the image forming apparatus 104. Here, the image forming apparatus for which the resource information acquisition ended in failure is determined to be the "image forming apparatus C (image forming apparatus 104c)" and thus image-forming-apparatus information relating to the image forming apparatus C is stored.

Next, at step S713, the device driver 302 temporarily stores the resource information of the image forming apparatus 104a for which the resource information acquisition ended in success. Here, resource information A acquired from the image forming apparatus A (image forming apparatus 104a) and resource information B acquired from the image forming apparatus B (image forming apparatus 104b) are temporarily stored.

Thus, in the above-described embodiment, a second exemplary determining unit is achieved, for example, by performing the processing corresponding to step S711, and a second exemplary storage unit is achieved, for example, by performing the processing corresponding to step S713.

Next, at step S714, the device driver 302 deactivates the device-information-acquisition button 507 shown on the device setting screen 500 of the device driver 302. Next, at step S715, the device driver 302 determines whether the failure of the resource information acquisition occurred repeatedly a predetermined number of times. If the determination result shows that the above-described failure occurred repeatedly the predetermined times (YES in steps S715), the processing advances to step S709, so that the device driver 302 sets the retry timer.

On the other hand, if the failure of the resource information acquisition did not occur repeatedly the predetermined number of times (NO in step S715), the processing advances to step S716, so that the device driver 302 waits for processing over a predetermined time. If the device driver 302 opens the device setting screen 500 based on an operation performed by the user in that state, the device-information-acquisition button 507 may be grayed out and deactivated, so as not to be selected by the user.

Then, after the predetermined time has elapsed (YES in step S716), the processing advances to step S717, so that the device driver 302 reacquires the resource information from the image forming apparatus 104 specified by the image-forming-apparatus information stored at step S712 (e.g., the image forming apparatus 104 for which the resource information acquisition ended in failure). Here, the device driver 302 reacquires the resource information from the image forming apparatus C.

Thus, in the above-described embodiment, a second exemplary acquisition section is achieved, for example, by performing the processing corresponding to step S717.

Next, at step S718, as shown in FIG. 7B, the device driver 302 determines whether the resource information is normally acquired (i.e., reacquired) from the image forming apparatus 104 (e.g., image forming apparatus C), for which the resource information acquisition ended in failure. If the determination result shows that the resource information is not normally acquired (NO in step S718), the processing returns to the above-described step S715, where the device driver 302 tries to reacquire the resource information a predetermined number of times.

On the other hand, if the resource information is normally acquired at step S718 (YES in step S718), the processing advances to step S719. Then, the device driver 302 compares the resource information stored at step S713 (e.g., the resource information items 801a and 801b) with the resource information acquired from the image forming apparatus 104 (e.g., image forming apparatus C) at step S717. Then, the processing advances to step S721.

Thus, in the above-described embodiment, another exemplary comparison section is achieved, for example, by performing the processing corresponding to step S718.

When the processing advances to step S721, the device driver 302 determines whether all of the resource information items acquired from the image forming apparatuses 104a to 104c (e.g., image forming apparatuses A to C) are the same as one another. If the determination result shows that all of the resource information items are the same as one another (YES in step S721), the processing advances to step S728, which will be described later. On the other hand, if all of the resource information items are not the same as one another, (i.e., at least one of the resource information items is different from the others)(NO in step S721), the processing advances to step S722. Since the resource information items 801a to 801c are different from one another in an example shown in FIG. 8, the processing advances to step S722.

At step S722, the device driver 302 deactivates the device-information-acquisition button 507 shown on the device setting screen 500 of the device driver 302. Next, the device driver 302 resets the automatic-resource-information-update flag 305 at step S723.

Next, at step S724, the device driver 302 compares the resource information items (e.g., resource information items 801a to 801c) acquired from the image forming apparatuses 104a to 104c (e.g., the image forming apparatuses A to C) with one another, and extracts a resource shared among the resource information items.

In the example shown in FIG. 8, "paper feed option "side paper deck", paper output option "finisher A", and internal spooling processing "automated," which are shared among the resource information items 801a to 801c, are extracted, as shared resources. Thus, according to the above-described embodiment, an exemplary extraction section is achieved, for example, by performing the processing corresponding to step S724.

Next, at step S725, the device driver 302 stores information about a resource shared among the resource information items in the resource-information-description unit 304. Thus, in the above-described embodiment, an exemplary storage section is achieved, for example, by performing the processing corresponding to step S725.

Next, at step S726, the device driver 302 sets information about the resource shared among the resource information to the items shown on the device setting screen 500 of the device driver 302. Next, at step S727, the device driver 302 deactivates the items that correspond to resources that are not shared among the resource information items, and that are shown on the device setting screen 500. According to the example shown in FIG. 8, the items corresponding to the puncher unit and the section management function are thus deactivated. After that, the processing procedures are terminated.

Figure 9:
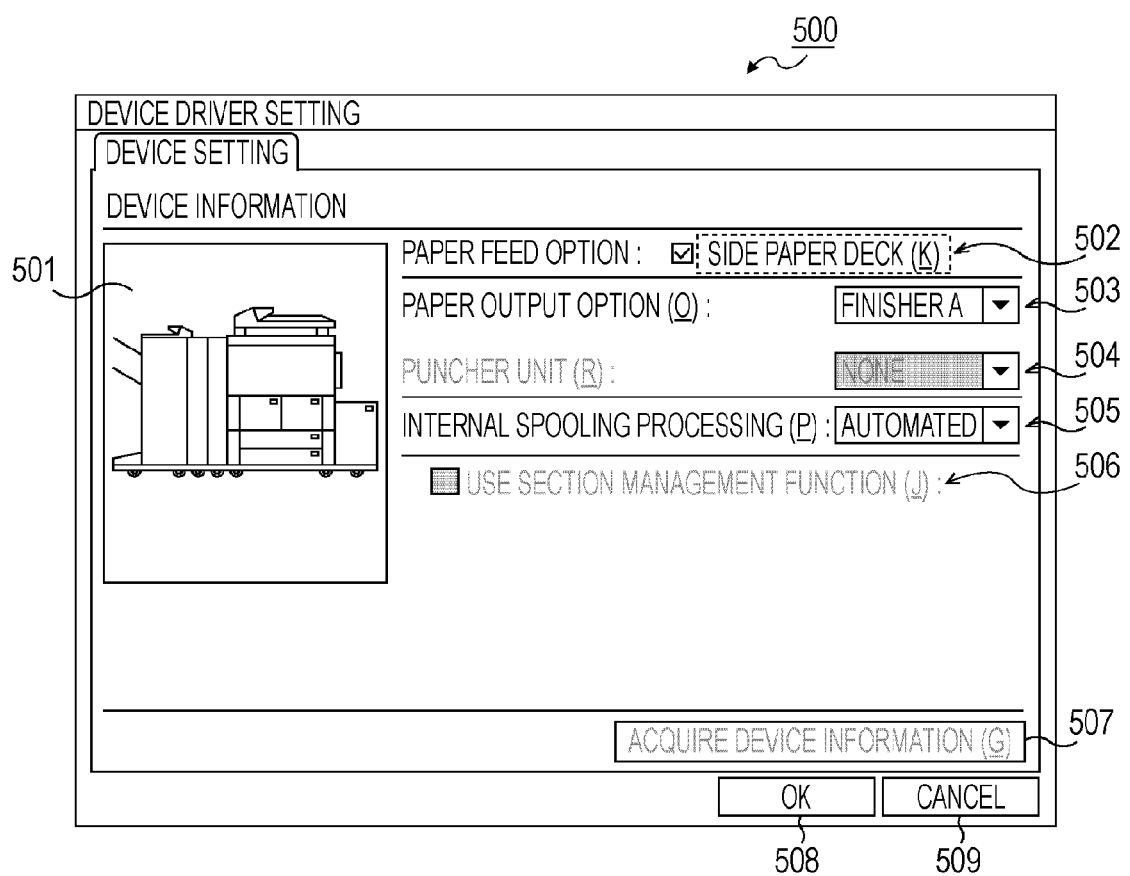
FIG. 9 shows an exemplary device setting screen in which only the items corresponding to resources shared among the image forming apparatuses are activated according to the second embodiment.

If the device driver 302 opens the device setting screen 500 based on an operation performed by the user in that state, the device setting screen 500 may be displayed on the display 205, as shown in FIG. 9.

FIG. 9 shows an example of the device setting screen 500 in which only the items corresponding to the resources shared among the image forming apparatuses 104 are activated. If the user performs an operation based on the execution of the device driver 302 by using the keyboard 213 or the like of the client PC 101, the device setting screen 500 is shown on the display 205 of the client PC 101.

The details on the items shown in FIG. 9 are the same as those shown in FIG. 5. However, the puncher-unit-setting area 504, the section-management-function-setting area 506, and the device-information-acquisition button 507 are deactivated, so as not to be selected and/or changed by the user, as shown in FIG. 9.

Returning to the description of FIG. 7B, if it is determined that all of the resource information items acquired from the image forming apparatuses 104a to 104c (e.g., image forming apparatuses A to C) are the same as one another at step S721 (YES in step S721), the processing advances to step S728. At step S728, the device driver 302 sets the automatic-resource-information-update flag 305.

Next, the device driver 302 stores the resource information items acquired at steps S710 and S717 in the resource-information-description unit 304 at step S729. Next, at step S730, the device driver 302 updates the items shown on the device setting screen 500 of the device driver 302 with the resource information items stored at step S729 (e.g., sets the resource information items stored at step S729 to the items shown on the device setting screen 500). Next, at step S731, the device driver 302 activates the device-information-acquisition button 507 shown on the device setting screen 500 of the device driver 302, and terminates the processing procedures.

Thus, according to the above-described embodiment, even though the device driver 302 controls the image forming apparatuses 104a to 104c, the acceptance of resource information items of the image forming apparatuses 104a to 104c is permitted, if all of the above-described resource information items are the same as one another.

Further, when the device driver 302 controls the image forming apparatuses 104a to 104c and the resource information items of the image forming apparatuses 104a to 104c are different from one another, acceptance is permitted only for resource information items shared among the above-described resource information items.

Therefore, in addition to the advantages described in the first embodiment, there is another advantage as below. Namely, even though the resources of the image forming apparatuses 104a to 104c are partly different from one another, resources shared among the image forming apparatuses 104a to 104c can be used while reducing print errors as much as possible.

Further, in the above-described embodiment, a resource shared among the resource information items may be extracted, and information about the extracted resource may be stored in the resource-information-description unit 304, so as to achieve the above-described advantage. However, the above-described processing procedures (e.g., steps S724 to S727) may not necessarily be performed.

According to the above-described embodiment, when the device driver controls a plurality of devices, the "device-function information" acquired from the device from then on is not stored, but abandoned. Therefore, it may become possible to prevent information about a function that can be executed by a certain device, and that can be executed by another device with difficulty, from being stored.

Consequently, when a single device driver controls operations of a plurality of devices, it may become possible to reduce errors occurring due to the difference between the functions of the above-described devices.

According to one embodiment, each of units of the information processing apparatuses according to the above-described embodiments of the present invention, and each of steps of the device management methods according to the above-described embodiments of the present invention, can be achieved by an operating program stored in a random-access memory (RAM) and/or a read-only memory (ROM) of a computer. Aspect of the invention may thus relate to a program and a computer-readable recording medium storing the program.

Furthermore, each of a system, an apparatus, a method, a program, a storage medium, etc., may constitute another embodiment of the present invention. More specifically, the present invention can be used for a system including plural units, or an apparatus including a single unit only.

Furthermore, in one embodiment, program code of software implementing the functions of the above-described embodiments (e.g., program code corresponding to the flow-charts of FIGS. 6 and 7 in the above-described embodiments) may be supplied to the system and/or the apparatus directly and/or remotely. Then, a computer of the system and/or the apparatus reads and executes the supplied program code, so that the functions of the above-described embodiments can be achieved, and thus may also constitute another embodiment of the present invention.

Therefore, the computer-readable storage medium having the program code itself that is installed in the computer, so as to achieve functional processing of the present invention by the computer, may also constitute another embodiment of the present invention. Namely, a computer-readable storage medium containing a computer program with computer-executable instructions provided to achieve the functional processing can constitute another embodiment of the present invention.

In that case, the above-described computer program having the computer-executable instructions may be object code, a program executed by an interpreter, script data supplied to an operating system (OS), etc., for example so long as the computer program has program functions.

The computer-readable storage medium provided to supply the computer executable instructions may comprise, for example, a floppy (registered trademark) disk, a hard disk, an optical disk, a magneto-optical disk, a magneto-optical disk (MO), a compact disk (CD)-read only memory (ROM), a CD-recordable (R), a CD-rewritable (RW), etc. The above-described medium may further comprise a magnetic tape, a nonvolatile memory card, a ROM, a digital-versatile disk (DVD) including a DVD-ROM and a DVD-R, etc.

Further, the program having the computer-executable instructions may be supplied in the following methods. For example, a user may access a home page established on the Internet by using a browser of a client computer. Then, the user downloads the computer program itself from the home page, and/or compressed file data including data on an automatic-install function, to the computer-readable storage medium, such as a hard disk.

Further, the program having the computer-executable instructions can be supplied by dividing program code generating the program of the present invention into plural file-data items, and downloading the file-data items from different home pages. Namely, a WWW server provided to download program-file-data items used to achieve the functional processing of the present invention by using a computer to plural users may also constitute another embodiment of the present invention.

Further, the program having the computer-executable instructions according to one embodiment of the present invention may be encoded and stored in storage mediums such as CD-ROMs distributed to users. Then, key information used to decode the encoded program may be downloaded from the home page to a user satisfying predetermined conditions via the Internet. Through the use of the downloaded key information, the instructions in the encoded program can be executed and installed in a computer, so that the program and instructions are supplied to the system and/or the apparatus.

Furthermore, not only by the computer reading and executing the instructions, but also by the computer executing part of or the entire process utilizing an OS, etc., running on the computer based on instructions of the program, the functions of the above-described embodiments may be achieved.

Furthermore, in one embodiment the computer-executable instructions of the program read from the recording medium may be written into a memory of a function-expansion board inserted into the computer and/or a function-expansion unit connected to the computer. Then, a central processing unit (CPU), etc. of the function-expansion board and/or the function-expansion unit may execute part of or the entire process based on instructions of the program, so that the functions of the above-described embodiments may be achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2008-024310 filed on Feb. 4, 2008, which is hereby incorporated by reference herein in its entirety.

What is claimed is:

1. An information processing apparatus in which a device driver is installed, the device driver being configured to control a plurality of devices, the information processing apparatus comprising:
   a first acquisition unit configured to acquire function information relating to a function of the device;
   a storage unit configured to store the acquired function information in a storage medium;
   a control unit configured to control an operation of the device through the device driver based on the stored function information in the storage medium;
   a determining unit configured to determine whether acquisition of function information, the acquisition being performed by the first acquisition unit, has succeeded;
   a comparison unit configured to perform a comparison process between function information of each of the plurality of devices controlled by the device driver when the determining unit determines that the acquisition of the function information from each of the plurality of devices has succeeded; and
   a second acquisition unit configured to reacquire, when the determining unit determines that the acquisition of the function information from any one of the plurality of devices has ended in failure, the function information from the device for which the acquisition of the function information has ended in failure,
   wherein the comparison unit performs the comparison process by using the function information acquired by the first acquisition unit and the function information acquired by the second acquisition unit, and
   wherein, when there is a difference between the function information of each of the plurality of devices as a result of the comparison process made by the comparison unit, the storage unit abandons a portion of the function information acquired by the first acquisition unit after the comparison process is made without storing the portion in the storage medium, wherein the portion is function information relating to at least a function which is not shared among the plurality of devices.

2. The information processing apparatus according to claim 1, further comprising an extraction unit configured to extract a function shared among the plurality of devices, when there is a difference between the function information of each of the plurality of devices as a result of the comparison process made by the comparison unit, based on the function information of the plurality of devices,
   wherein the storage unit stores function information relating to the extracted function in the storage medium.

3. A device management method to manage at least one device by using a device driver configured to control a plurality of devices, the device management method comprising:
   in a first acquisition step, acquiring function information relating to a function of the device;
   storing the acquired function information in a storage medium;
   controlling an operation of the device through the device driver based on the stored function information in the storage medium;
   determining whether acquisition of function information in the first acquisition step has succeeded;
   performing a comparison process between function information of each of the plurality of devices controlled by the device driver when it is determined that the acquisition of the function information from each of the plurality of devices has succeeded; and
   in a second acquisition step, reacquiring, when it is determined that the acquisition of the function information from any one of the plurality of devices has ended in failure, the function information from the device for which the acquisition of the function information has ended in failure,
   wherein the comparison process is performed by using the function information acquired in the first acquisition step and the function information acquired in the second acquisition step, and
   wherein, when there is a difference between the function information of each of the plurality of devices as a result of the comparison process, a portion of the function information acquired in the first acquisition step is abandoned after the comparison process is made without storing the portion in the storage medium, wherein the portion is function information relating to at least a function which is not shared among the plurality of devices.

4. The device management method according to claim 3, further comprising extracting a function shared among the plurality of devices, when there is a difference between the function information of each of the plurality of devices as a result of the comparison process, based on the function information of the plurality of devices,
   wherein function information relating to the extracted function is stored in the storage medium.

5. A non-transitory computer-readable storage medium containing computer-executable instructions for controlling a computer to execute a device management method to manage at least one device by using a device driver configured to control a plurality of devices, the computer-readable storage medium comprising:

- computer-executable instructions for, in a first acquisition step, acquiring function information relating to a function of the device;
- computer-executable instructions for storing the acquired function information in a storage medium;
- computer-executable instructions for controlling an operation of the device through the device driver based on the stored function information in the storage medium;
- computer-executable instructions for determining whether acquisition of function information in the first acquisition step has succeeded;
- computer-executable instructions for performing a comparison process between function information of each of the plurality of devices controlled by the device driver when it is determined that the acquisition of the function information from each of the plurality of devices has succeeded; and
- computer-executable instructions for, in a second acquisition step, reacquiring, when it is determined that the acquisition of the function information from any one of the plurality of devices has ended in failure, the function information from the device for which the acquisition of the function information has ended in failure,
- wherein the comparison process is performed by using the function information acquired in the first acquisition step and the function information acquired in the second acquisition step, and
- wherein, when there is a difference between the function information of each of the plurality of devices as a result of the comparison process, a portion of the function information acquired in the first acquisition step is abandoned after the comparison process is made without storing the portion in the storage medium, wherein the portion is function information relating to at least a function which is not shared among the plurality of devices.

* * * * *